US008730917B2

(12) United States Patent
Xie

(10) Patent No.: US 8,730,917 B2
(45) Date of Patent: May 20, 2014

(54) METHOD AND SYSTEM FOR REALIZING SINGLE RADIO VOICE CALL CONTINUITY

(75) Inventor: Zhenhua Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 43 days.

(21) Appl. No.: 13/258,315

(22) PCT Filed: Dec. 21, 2009

(86) PCT No.: PCT/CN2009/075759
§ 371 (c)(1),
(2), (4) Date: Apr. 19, 2012

(87) PCT Pub. No.: WO2010/145144
PCT Pub. Date: Dec. 23, 2010

(65) Prior Publication Data
US 2012/0207127 A1 Aug. 16, 2012

(30) Foreign Application Priority Data

Oct. 19, 2009 (CN) .............................. 200910177919

(51) Int. Cl.
*H04W 4/00* (2009.01)
(52) U.S. Cl.
USPC ........... 370/331; 370/225; 370/228; 370/352; 370/356; 455/436; 455/438; 455/440; 455/444
(58) Field of Classification Search
CPC ................................................ H04W 36/0022
USPC ......................... 370/225, 228, 352–356, 331; 455/436–444
See application file for complete search history.

(56) References Cited

U.S. PATENT DOCUMENTS 7,668,159 B2 * 2/2010 Buckley et al. ................ 370/354
7,885,234 B2 * 2/2011 Ejzak ............................. 370/331
(Continued)

FOREIGN PATENT DOCUMENTS

CN  101217702 A  7/2008
CN  101227647 A  7/2008
(Continued)

OTHER PUBLICATIONS

International Search Report on international application No. PCT/CN2009/075759, mailed on Jul. 29, 2010.
(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

The disclosure discloses a method for realizing single radio voice call continuity, which is applied in an IP Multimedia Core Network Subsystem (IMS) network. The method includes: receiving, by a service continuity application server (SC AS), a handover request, and then updating, by the SC AS, a remote leg, and transmitting, by the SC AS, a handover notification message to a user terminal; receiving, by the user terminal, a handover command in a Packet Switch (PS) domain and the handover notification message, then adjusting, by the user terminal, an access mode to be accessing a Circuit Switch (CS) domain. The invention further discloses a system for realizing single radio voice call continuity. The method and system for realizing enhancement of single radio voice call continuity provided by the disclosure can effectively reduce the overlong interruption time in the prior art, and greatly improve the user experience.

14 Claims, 4 Drawing Sheets

(56) References Cited

U.S. PATENT DOCUMENTS

| | | | |
|---|---|---|---|
| 7,995,562 B2* | 8/2011 | Purnadi et al. | 370/352 |
| 8,064,907 B2* | 11/2011 | Gallagher et al. | 455/435.1 |
| 8,180,347 B2* | 5/2012 | You et al. | 455/436 |
| 8,249,016 B1* | 8/2012 | Kalbag et al. | 370/331 |
| 8,249,019 B2* | 8/2012 | Mahdi | 370/331 |
| 8,275,377 B2* | 9/2012 | Nanda et al. | 455/436 |
| 8,331,318 B2* | 12/2012 | Zhu | 370/331 |
| 8,340,081 B2* | 12/2012 | Salkintzis et al. | 370/352 |
| 8,406,228 B2* | 3/2013 | Bienas et al. | 370/389 |
| 8,503,391 B2* | 8/2013 | Mahdi | 370/331 |
| 8,520,682 B2* | 8/2013 | Mahdi | 370/495 |
| 8,543,114 B2* | 9/2013 | Hallenstal et al. | 455/436 |
| 2006/0276179 A1* | 12/2006 | Ghaffari et al. | 455/412.2 |
| 2006/0276192 A1* | 12/2006 | Dutta et al. | 455/436 |
| 2007/0041367 A1* | 2/2007 | Mahdi | 370/352 |
| 2007/0159976 A1* | 7/2007 | Dekeyzer et al. | 370/236 |
| 2007/0195754 A1* | 8/2007 | Shaheen | 370/352 |
| 2007/0254625 A1* | 11/2007 | Edge | 455/404.1 |
| 2008/0004007 A1* | 1/2008 | Kallio | 455/432.2 |
| 2008/0026752 A1* | 1/2008 | Flore et al. | 455/435.2 |
| 2008/0181205 A1 | 7/2008 | Azada | |
| 2009/0067408 A1* | 3/2009 | Leppainen et al. | 370/350 |
| 2009/0086674 A1* | 4/2009 | Ejzak | 370/331 |
| 2009/0109924 A1* | 4/2009 | Sato | 370/331 |
| 2009/0225725 A1* | 9/2009 | Zhu | 370/331 |
| 2010/0040020 A1* | 2/2010 | Chen | 370/331 |
| 2010/0048175 A1* | 2/2010 | Osborn | 455/411 |
| 2010/0093346 A1* | 4/2010 | Song et al. | 455/435.1 |
| 2010/0098023 A1* | 4/2010 | Aghili et al. | 370/331 |
| 2010/0135246 A1* | 6/2010 | Hallental | 370/331 |
| 2010/0142488 A1* | 6/2010 | Zhang et al. | 370/332 |
| 2010/0150110 A1* | 6/2010 | Dutta et al. | 370/331 |
| 2010/0215018 A1* | 8/2010 | Ejzak | 370/331 |
| 2010/0279684 A1* | 11/2010 | Salkintzis | 455/434 |
| 2011/0176510 A1* | 7/2011 | Hallenstal et al. | 370/331 |

FOREIGN PATENT DOCUMENTS

| | | |
|---|---|---|
| CN | 101262414 A | 9/2008 |
| CN | 101374343 A | 2/2009 |
| WO | 2008081310 A1 | 7/2008 |
| WO | 2008094426 A2 | 8/2008 |

OTHER PUBLICATIONS

English Translation of the Written Opinion of the International Search Authority in international application No. PCT/CN2009/075759, mailed on Jul. 29, 2010.

Single Radio Voice Call Continuity (SRVCC) enhancements Sep. 30, 2009.

* cited by examiner

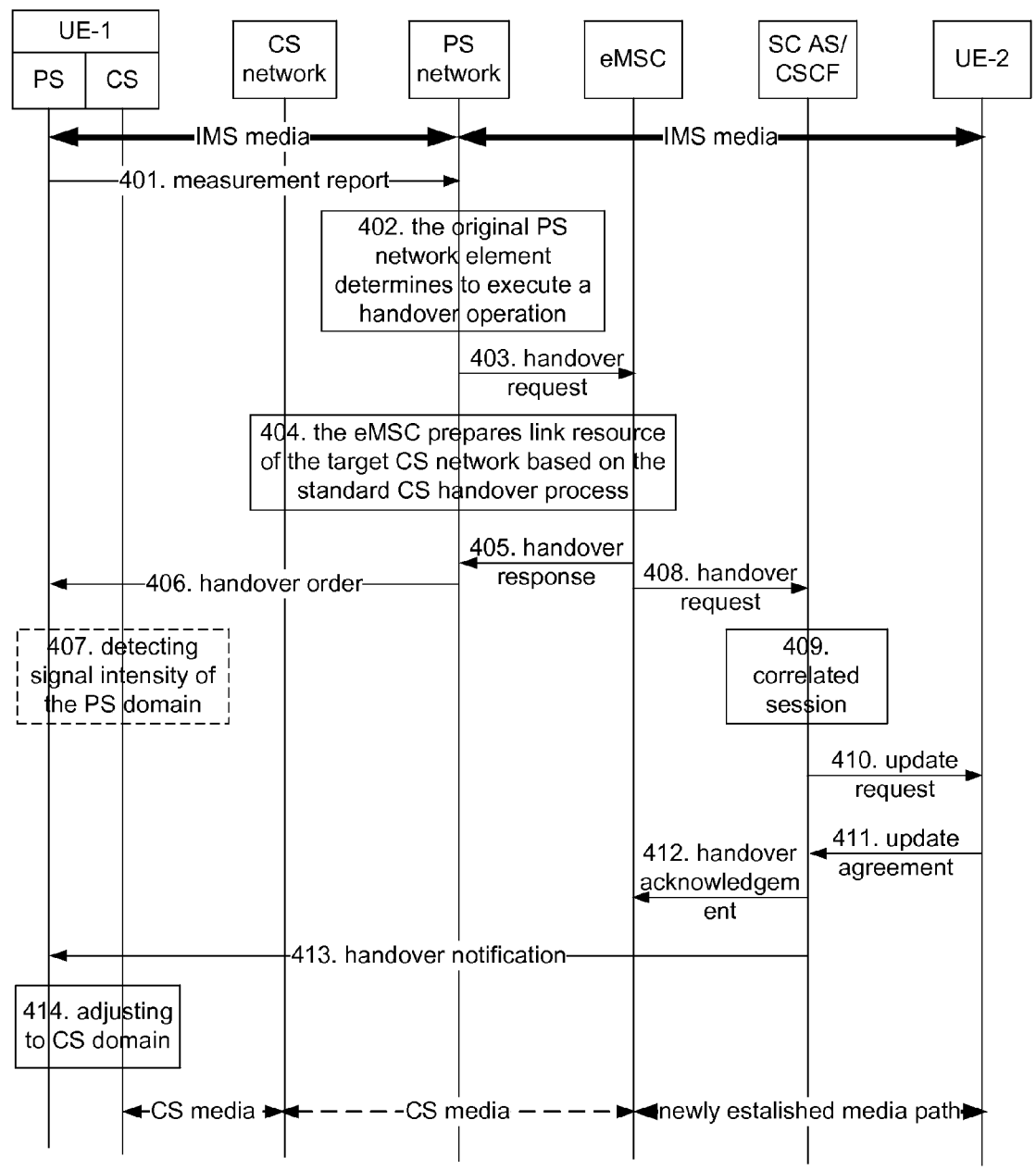

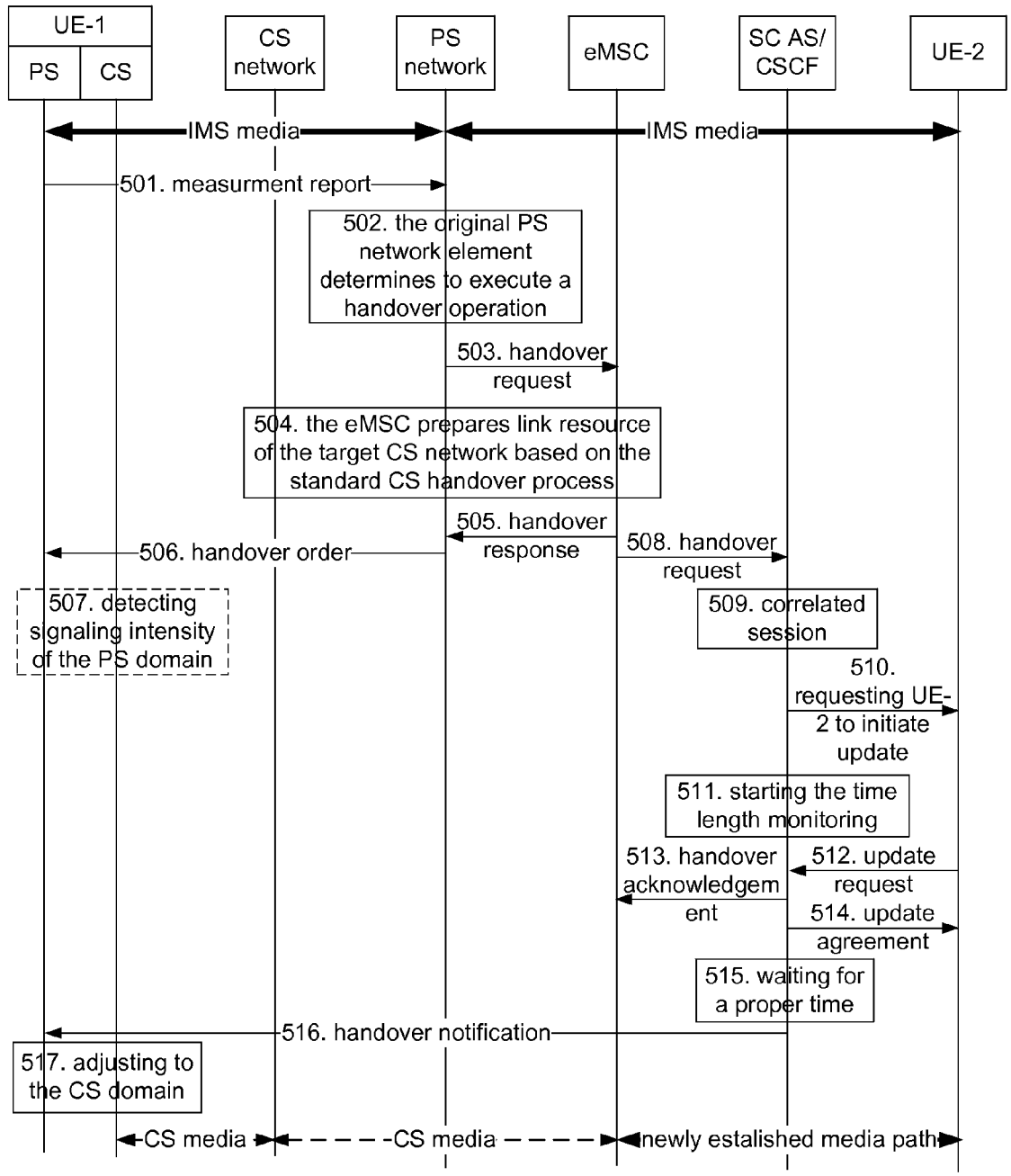

METHOD AND SYSTEM FOR REALIZING SINGLE RADIO VOICE CALL CONTINUITY

TECHNICAL FIELD

The disclosure relates to the communication field, in particular to a method and system for realizing single radio voice call continuity in an Internet Protocol (IP) multimedia subsystem.

BACKGROUND

The IP Multimedia Core Network Subsystem (IMS) is an IP-based network architecture proposed by the 3rd Generation Partnership Project (3GPP), which constructs an opening and flexible service environment; the IMS supports multimedia applications and is capable of providing abundant multimedia services for a user.

In an IMS service system, a control layer is separated from a service layer; the control layer does not provide a specific service and only provides necessary functions such as triggering, routing and charging, for the service layer.

Service triggering and control functions in the control layer are implemented by a Call Session Control Function (CSCF). The call session control function may be classified into three types, namely, a Proxy Call Session Control Function (P-CSCF), an Interrogating Call Session Control Function (I-CSCF) and a Serving Call Session Control Function (S-CSCF), wherein the S-CSCF plays a leading role and the I-CSCF is optional.

The service layer is composed of a series of Application Servers (ASs), and is capable of providing specific services, and an AS can be an independent entity or exists in the S-CSCF.

The control layer (S-CSCF) controls the service triggering according to subscription information of a user and calls a service on the AS to realize service functions. All the ASs and the S-CSCFs can be called Server Equipment (SE).

An End-to-end equipment in a session is called a User Equipment (UE), which is in charge of interaction with the user; some UEs have a plurality of way for accessing to a network, such as accessing the network through a 3GPP Packet Switch (PS) domain, accessing the network through another non-3GPP PS domain, accessing the network through a circuit switch (CS) domain or the like.

If a CS network is configured with an enhanced Mobile Switch Center (eMSC), and a Session Initial Protocol (SIP) interface is provided by the eMSC to perform interaction with an IMS network, then interaction between the IMS network and the CS network can be implemented through the eMSC.

For the UE with a plurality of accessing ways, if the UE can only use one accessing way at a certain time, in a case that the UE is performing a certain service, such as a call in one accessing way and then the UE moves to another place and needs to change the accessing way, the UE and the network has an ability to provide a certain strategy, which makes that the service which is performing by the UE would not be interrupted; and this kind of ability is called single radio terminal voice call continuity, which is called Single Radio Voice Call Continuity (SRVCC) for short.

FIG. 1 shows a diagram of single radio voice call continuity, which describes a signaling path and a media path for session establishment between a single radio terminal UE-1 and an IMS terminal UE-2, as well as the signaling path and media path of the UE-1 and the UE-2 after the single radio terminal call continuity occurs; in order to simplify the diagram and description, the S-CSCF and a Service Continuity AS (SC AS) are drawn as a single entity, and a SIP protocol based on an IMS standard is used for communication between the S-CSCF and the SC AS.

A session between the UE-1 and the UE-2 is established before the single radio voice call continuity occurs, and the signaling path of the session is described as follows:

A102: the signaling path between the UE-1 and the P-CSCF, through which the UE-1 and the P-CSCF communicate with each other based on the SIP protocol of the IMS; for the SC AS, the signaling path is an access leg path;

A104: the signaling path between the P-CSCF and the SC AS/S-CSCF, through which the P-CSCF and the SC AS/S-CSCF communicate with each other based on the SIP protocol of the IMS; for the SC AS, the signaling path is also an access leg path;

R101: the signaling path between the SC AS/S-CSCF and the UE-2, through which the SC AS/S-CSCF and the UE-2 communicate with each other based on the SIP protocol of the IMS; for the SC AS, the signaling path is a remote leg path;

After the single radio voice call continuity occurs, the signaling path and the media path between the UE-1 and the UE-2 changes, wherein the changed signaling path is described as follows:

A112: the signaling path between the UE-1 and the eMSC, through which the UE-1 and the eMSC communicate with each other based on the signaling protocol of the CS domain; for the SC AS, the signaling path is an access leg path;

A114: the signaling path between the eMSC and the SC AS/S-CSCF, through which the eMSC and the SC AS/S-CSCF communicate with each other through the SIP protocol of the IMS; for the SC AS, the signaling path is also an access leg path;

R101: the signaling path between the SC AS/S-CSCF and the UE-2, through which the SC AS/S-CSCF and the UE-2 communicate with each other based on the SIP protocol of the IMS; for the SC AS, the signaling path is a remote leg path, which does not change after the single radio voice call continuity occurs.

FIG. 2 shows an architecture diagram of the existing single radio voice call continuity; in order to realize the single radio voice call continuity, a variety of related parts or network elements, which participate in realizing the single radio voice call continuity, of the network, and the interfaces or connection relationships between the parts or the network elements, and the details are as follows:

Descriptions of Related Network Elements:

UE: a user terminal equipment with single radio voice call continuity ability;

CS network: a network providing conventional CS service for a user;

PS network: a network providing PS service for the user;

eMSC: an enhanced mobile switch center, which processes the handover request transmitted by the PS network, performs an inter-domain transferring of a session, correlates a CS handover operation and an inter-domain transferring operation, and the like;

IMS network: a network providing an IMS service for the user, which includes the SC AS Descriptions of Related Interfaces:

S202: an air interface between the UE and the CS network, which implements the information interaction between the UE and the CS network, such as a standard Um interface;

S204: an interface between the CS network and the eMSC, which varies depending on connected specific network elements; the interface between the eMSC and the base station subsystem is a standard Iu-CS interface; the interfaces between the eMSC and other mobile switch centers are standard inter-office signaling interfaces, e.g. an E interface and a Nc interface;

A112 in FIG. 1 interacts with the eMSC through S202 and S204 as described above.

S206: an air interface between the UE and the PS network, which realizes the information interaction between the UE and the PS network, such as a standard Uu interface;

S208: a signaling interface between the PS network and the eMSC, which provides support for inter-domain switch and is a standard Sv interface;

S210: a signaling interface between the UE and the IMS network, such as a standard Gm interface, which bears signaling transmission through data generated by the interface S208;

A102 in FIG. 1 interacts with the IMS network through S210.

S212: a signaling path between the eMSC and the IMS network, which may either be a standard I2 interface between the eMSC and the IMS network which is based on SIP protocol of the IMS, or be composed by connection of a standard Nc interface between the eMSC and the media gateway and a standard Mg interface between the media gateway and the IMS network; wherein in the latter case, a media gateway translates a message on the Nc interface into an SIP message of the IMS or conversely translates the messages; the Nc interface is based on an SIP protocol (i.e. Nc-SIP), or based on an ISUP protocol (i.e. Nc-ISUP); although the Nc-SIP is based on SIP protocol as well as the I2 interface, the protocols only provide the format of messages and the content of the messages is determined by an application; the use of I2 interface indicates that the eMSC supports an application related to the IMS; and the use of Nc-SIP interface indicates that the eMSC supports an application related to the conventional CS.

FIG. 3 shows a flowchart of an existing method for realizing single radio voice call continuity, in which a process is described: an IMS session between a UE-1 and a UE-2 is established so as to establish an IMS media connection path; the IMS media connection path is composed of a media connection between the UE and the PS network and a media connection between the PS network and the UE-2; after the single radio voice call continuity of the UE-1 occurs, the UE-1 and the network enable the UE-1 to established the media connection by using the CS domain and maintain the continuity of the original session. The process includes the following steps:

step 301: the UE-1 transmits a measuring report to the PS network serving the UE-1 through the interface S204 between the UE-1 and the PS network, to report signal intensity measuring information of a cell;

step 302: the PS network serving the UE-1 (original PS network) determines that an adjacent CS networks is more suitable for serving the UE-1 according to the signal intensity information of the cells in the measuring report, and then decides to perform the handover operation;

step 303: a corresponding network element in the original PS network, such as a Mobile Management Entity (MME), transmits a handover request, such as a HANDOVER REQUEST message, to the eMSC through the interface S210 between the PS network and the eMSC; the message includes number information of the UE-1 and number information which is obtained through a Home Subscriber Server (HSS) by the PS network and is configured to identify a service continuity request;

step 304: the eMSC prepares media link resource for a target CS network according to the standard CS handover process;

step 305: after the CS handover process is completed, the eMSC transmits a handover response message, such as a HANDOVER RESPONSE message, to the PS network through the S210 interface;

step 306: the PS network transmits a handover command message to the UE-1 through the interface S204 after receiving the handover response message, and informs the UE-1 to hand over to the CS domain;

step 307: the UE-1 receives the handover command and adjusts the access mode to be accessing the CS domain.

So far, the CS media connection path between the UE-1 and the eMSC is established, which is composed of the CS media connection between the UE-1 and the CS network and the CS media connection between the CS network and the eMSC.

The following steps occur after step 303 and do not have ordinal relation with steps 304-307;

step 308: the eMSC transmits a handover request to the SC AS after receiving the handover request message from PS network; the request, such as an INVITE message of the SIP or an Initial Address Message (IAM) of the ISUP, is transmitted through the signaling path of S212; and all the messages are INVITE messages when arriving at the SC AS after transmitting through some network elements; the handover request includes number information of the UE-1 and number information of the SC AS, wherein the number information of the SC AS is used as information of a callee (this kind of INVITE message including the number information of the SC AS as information of the callee is considered as a handover request message by the SC AS), and number information of the UE-1 is used as information of a caller;

step 309: the SC AS finally receives the SIP INVITE message of the IMS which is forwarded by CSCF, determines that it is a service continuity request according to the information of the callee and then searches out the on-going call correlated with the current call according to the information of the caller;

step 310: the SC AS transmits an update request of the IMS, such as an UPDATE message or a re-INVITE message, through the CSCF on a signaling path of the correlated on-going call;

step 311: the UE-2 receives the update message, responding an update agreement message of the IMS, for example transmitting a 200 OK message;

step 312: the SC AS receives the update agreement message forwarded by the CSCF, transmits a handover acknowledgement message, such as a 200 OK message, to the eMSC through signaling path of S212; the eMSC may finally receive a 200 OK message of the SIP, or an ANM message(acknowledgement message) of the ISUP.

So far, a new media path between the eMSC and the UE-2 is established; the eMSC connects the newly established media path with the CS media path, to enable the UE-1 to communicate with the UE-2 continually.

As mentioned, the update operation of the remote leg is needed in steps 310-311 in existing method for realizing single radio voice call continuity; the time delay of the IMS signaling transmission is long and the period of time for the UE to hand over from the PS domain to the CS domain is short, thus it is still needed to wait for a long period of time to complete establishing the new media path after establishing the CS media, which causes an overlong interruption of communication.

SUMMARY

The technical problem to be solved by the disclosure is to overcome the disadvantages of the prior art and provide a method and system for realizing single radio voice call continuity, to reduce the time of voice interruption in the handover process.

To solve the problem above, the disclosure discloses a method for realizing single radio voice call continuity, which is applied in IP Multimedia Core Network Subsystem (IMS) network, and includes:

receiving, by a Service Continuity Application Server (SC AS), a handover request, and then updating, by the SC AS, a remote leg, and transmitting, by the SC AS, a handover notification message to a user terminal;

receiving, by the user terminal, a handover command in a Packet Switch (PS) domain and the handover notification message, then adjusting, by the user terminal, an access mode to be accessing a Circuit Switch (CS) domain.

The method may further include: detecting, by the user terminal, a signal intensity of the PS domain after the user terminal receives the handover command in the PS domain; and adjusting, by the user terminal, the access mode to be accessing the CS domain if the signal intensity of the PS domain is lower than a given threshold, even though the user terminal does not receive the handover notification message.

The method may further include:

receiving, by the SC AS, an update agreement message fed back by the remote leg, and then transmitting, by the SC AS, the handover notification message to the user terminal.

Further, in the method, the step of the SC AS receiving the handover request and then updating the remote leg and transmitting the handover notification message to the user terminal may include:

transmitting, by the SC AS, a message requesting for initiating update to the remote leg after the SC AS receives the handover request;

receiving, by the SC AS, an update request message transmitted from the remote leg, then transmitting, by the SC AS, an update agreement message to the remote leg and transmitting, by the SC AS, the handover notification message to the user terminal after waiting for a period of time; wherein the waiting period of time does not exceed a difference between a time period for transmitting the update agreement message to the remote leg and a time period for transmitting the handover notification message to the user terminal.

The method may further include: measuring, by the SC AS, a time length between a time of transmitting the message requesting for initiating update and a time of receiving the update request message, and determining, by the SC AS, the waiting period of time according to the time length.

Further, in the method, the handover notification message may be an IMS signaling message.

The disclosure further discloses a system for realizing single radio voice call continuity, and the system includes a user terminal, a remote leg of the user terminal, and an SC AS, wherein the user terminal is configured to receive a handover command in a PS domain, and configured to adjust an access mode to be accessing a CS domain after receiving a handover notification message transmitted from the SC AS;

the SC AS is configured to receive a handover request, and then update the remote leg and transmit the handover notification message to the user terminal.

Further, in the system, the user terminal may be further configured to, after receiving the handover command in the PS domain, adjust the access mode to be accessing the CS domain if the signal intensity of the PS domain is lower than a given threshold, even though the user terminal does not receive the handover notification message.

Further, in the system, the SC AS may be configured to receive an update agreement message fed back by the remote leg and then transmit the handover notification message to the user terminal.

Further, in the system, the SC AS may be configured to transmit a message requesting for initiating update to the remote leg after receiving the handover request; the SC AS may be further configured to receive an update request message transmitted from the remote leg, then transmit an update agreement message to the remote leg, and transmit the handover notification message to the user terminal after waiting for a period of time; wherein the waiting period of time does not exceed a difference between a time period for transmitting the update agreement message to the remote leg and a time period for transmitting the handover notification message to the user terminal.

Further, in the system, the SC AS may be further configured to measure a time length between a time of transmitting the message requesting for initiating update and a time of receiving the update request message, and determine the waiting period of time according to the time length.

Further, in the system, the handover notification message transmitted by the SC AS may be an IMS signaling message.

The method and system for enhancing single radio voice call continuity provided by the disclosure can effectively reduce the problem of overlong interruption time in the prior art and greatly improve the user experience.

BRIEF DESCRIPTION OF THE DRAWINGS

FIG. 4 shows a first flowchart of a method for realizing the single radio voice call continuity according to the disclosure;

FIG. 5 shows a second flowchart of a method for realizing the single radio voice call continuity according to the disclosure.

DETAILED DESCRIPTION

The main idea of the disclosure is that when a terminal with single radio voice call continuity receives a handover command, the terminal does not hand over to a CS domain immediately, but performs the handover after receiving a notification of PS network or when a signal intensity of PS network is too weak.

The disclosure is described in detail below with reference to the accompanying drawings and embodiments.

The disclosure discloses a method for realizing the single radio voice call continuity, which is applied in an IP Multimedia Core Network Subsystem (IMS) network, and the method includes:

receiving, by a Service Continuity Application Server (SC AS), a handover request, and then updating, by the SC AS, a remote leg, and transmitting, by the SC AS, a handover notification message to a user terminal; receiving, by the user terminal, a handover command in a Packet Switch (PS) domain and the handover notification message, then adjusting, by the user terminal, an access mode to be accessing a Circuit Switch (CS) domain.

Specifically, after the user terminal receives the handover command in the PS domain, adjusting, by the user terminal, the access mode to be accessing the CS domain if the signal intensity of the PS domain is lower than a given threshold, even though the user terminal does not receive the handover notification message.

Specifically, the step of the SC AS receiving the handover request and then updating the remote leg and transmitting the handover notification message to the user terminal through the PS domain may include:

receiving, by the SC AS, an update agreement message fed back by the remote leg, and then transmitting, by the SC AS, the handover notification message to the user terminal; or transmitting, by the SC AS, a message requesting for initiating update to the remote leg, and receiving, by the SC AS, an update request message transmitted from the remote leg, then transmitting, by the SC AS, an update agreement message to the remote leg; and transmitting, by the SC AS, the handover notification message to the user terminal after waiting for a period of time; wherein the waiting period of time does not exceed a difference between a time period for transmitting the update agreement message to the remote leg and a time period for transmitting the handover notification message to the user terminal.

Figure 1:
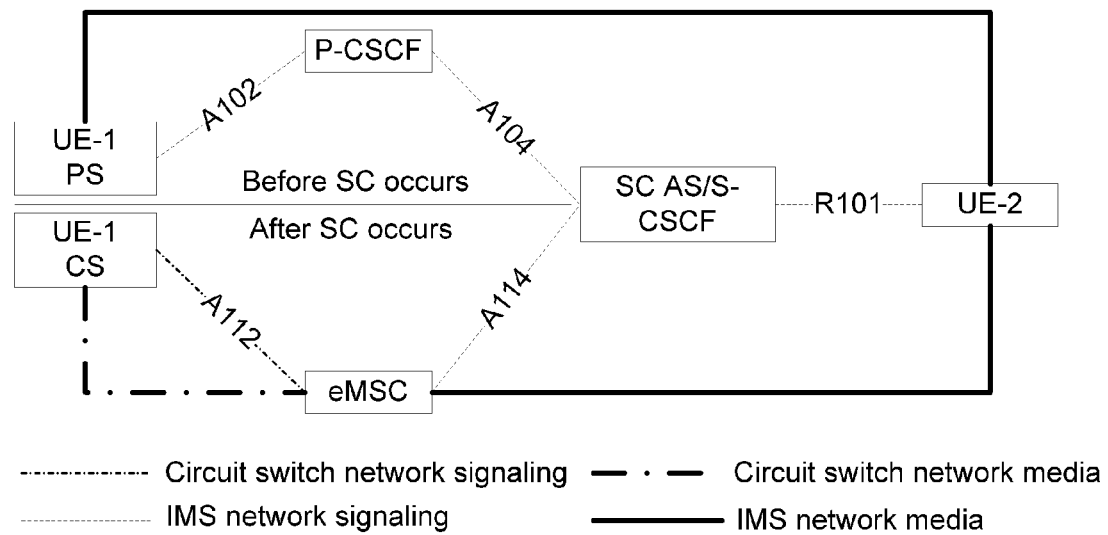
FIG. 1 shows a diagram of single radio voice call continuity.
Figure 2:
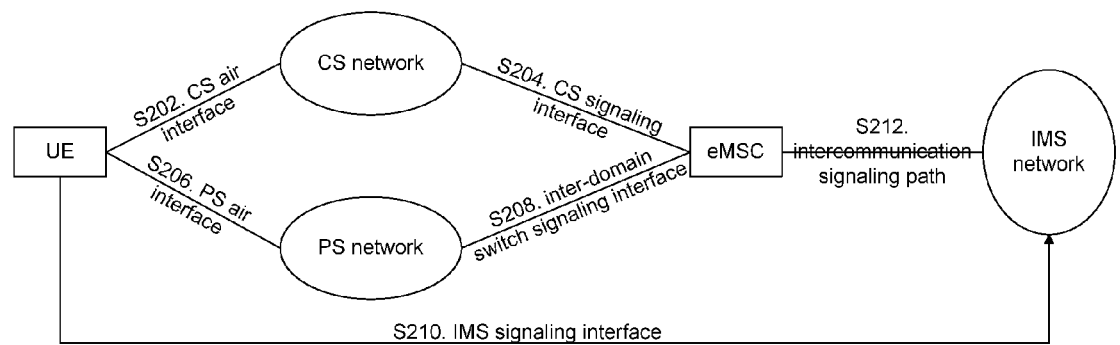
FIG. 2 shows a structural diagram of the existing single radio voice call continuity.
Figure 3:
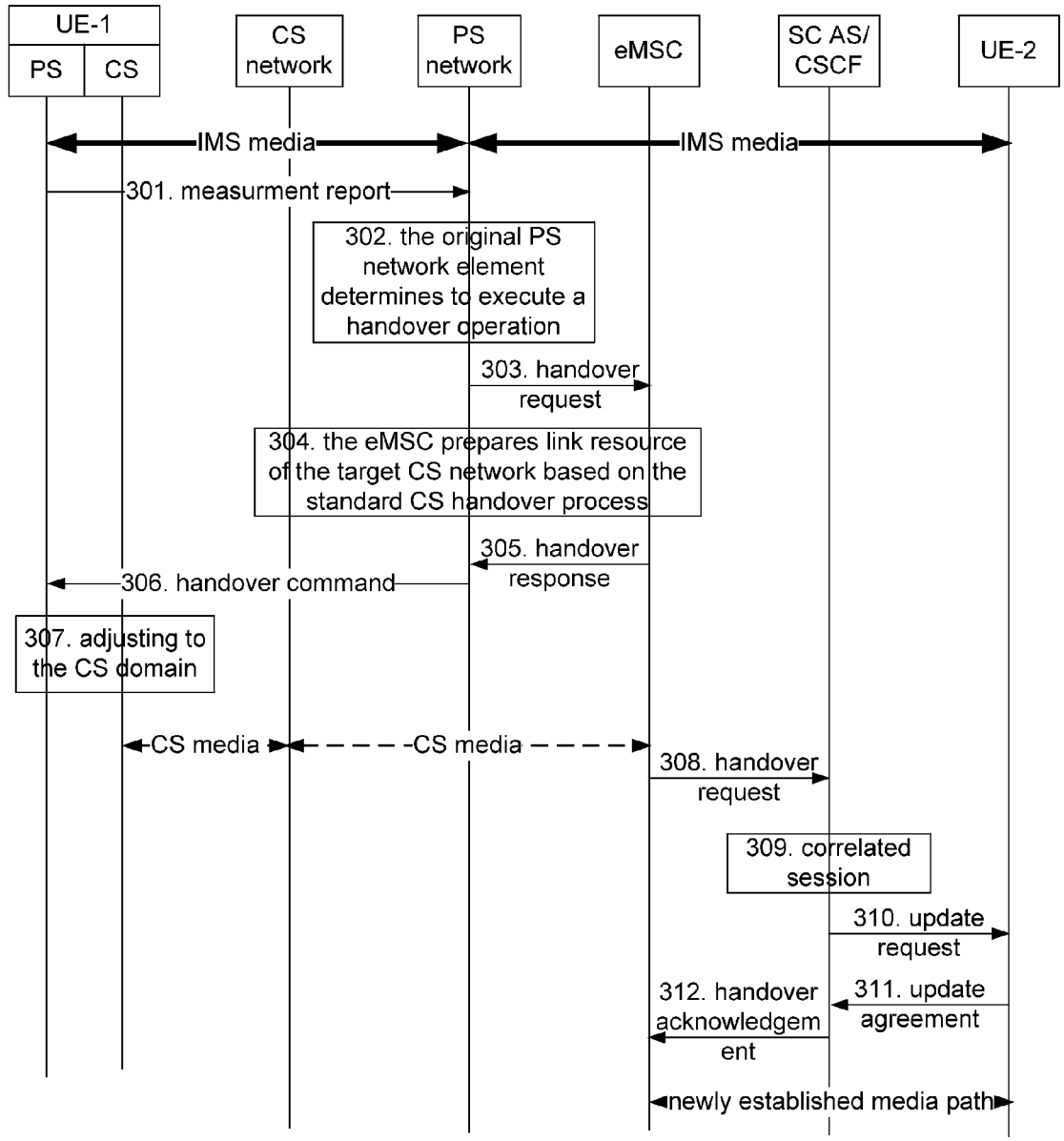
FIG. 3 shows a flowchart of the existing method for realizing the single radio voice call continuity.

FIG. 4 shows a first flowchart of a method for realizing single radio voice call continuity according to the disclosure, in which a process is described: an IMS session between a UE-1 and a UE-2 is established, and after the establishment of the IMS session, single radio voice call continuity of the UE-1 occurs, the UE-1 and the network enable UE-1 to establish a media connection by using the CS domain and maintain the continuity of the original session. The process includes the following steps:

steps 401-406: the same as steps 301-306 in FIG. 3;

step 407: after receiving the handover command, the UE-1 does not hand over to the CS domain immediately but waits for a proper time for the handover;

steps 408-412: the same as steps 308-312 in FIG. 3;

step 413: after receiving the update agreement message forwarded by the CSCF, the SC AS transmits a handover notification message to the UE-1 through the PS domain, for example transmitting an INFO message of the IMS;

specifically, the execute sequence between step 412 and step 413 can be exchanged with each other;

step 414: after receiving the handover notification message, the UE-1 adjusts the access mode to be accessing the CS domain.

Further, in step 407, when the UE-1 is waiting for a handover time, the UE-1 may start to monitor the signal intensity of the PS domain; before the UE-1 receives the handover message, if the UE-1 finds out that the signal intensity of the PS domain is lower than a given threshold (e.g. too weak to continue a call), the UE-1 hands over to the CS domain immediately (namely, adjusts the access mode to be accessing the CS domain) without waiting for receiving the handover notification message.

As mentioned, a CS media connection path between the UE-1 and the eMSC is established, which is composed of the CS media connection between the UE-1 and the CS network and the CS media connection between the CS network and the eMSC; and a new media path between the eMSC and the UE-2 is established at the same time; the eMSC connects the newly established media path with the CS media path, so as to enable the UE-1 to maintain a call with the UE-2.

FIG. 5 shows a second flowchart of a method for realizing single radio voice call continuity according to the disclosure, in which a process is described: an IMS session between the UE-1 and the UE-2 is established, and after the establishment of the IMS session, single radio voice call continuity of the UE-1 occurs, the UE-1 and the network enable the UE-1 to establish a media connection by using the CS domain and maintain the continuity of the original session. The process includes the following steps:

steps 501-507: the same as steps 401-407 in FIG. 4;

steps 508-509: the same as steps 308-309 in FIG. 3;

step 510: the SC AS transmits a message requesting for initiating update of the IMS to the UE-2 through the CSCF on a correlated calling signaling path, for example transmits a re-INVITE message, wherein the message does not include any media resource information;

step 511: at the same time of step 510, the SC AS starts a time length monitoring so as to monitor the time period from transmitting the message in step 510 to receiving a response;

step 512: the UE-2 transmits an update request message to the SC AS after receiving the message requesting for initiating update, for example transmits a 200 OK message of the IMS signaling, and the message includes media resource information of the UE-2;

step 513: the SC AS receives the update request message forwarded from the CSCF, and transmits a handover acknowledgement message to the eMSC through a signaling path of S212, for example transmits a 200 OK message, which includes media resource information of the UE-2 obtained in step 512; the eMSC may finally receive a 200 OK message of SIP or an Answer Message (ANM) of ISUP; the SC AS measures the time length between the time of transmitting the message requesting for initiating update and the time of receiving the update request message after receiving the update request message;

step 514: the SC AS transmits an update agreement message to the UE-2, for example, transmits Acknowledgement (ACK) information of the IMS signaling;

step 515: the SC AS waits for a period of time after transmitting the update agreement message; the period of time does not exceed the difference between the time period for transmitting the update agreement message to the UE-2 and the time period for transmitting the handover notification message to the UE-1; specifically, the SC AS may start a timer and executes step 516 after the waiting period of time.

The period of time may be determined according to the following way:

the SC AS determines the approximate time for transmitting the message to the UE-2 in step 514 according to time length information obtained in step 513, for example half of the time length in step 513 can be estimated as the time length for transmitting the message to the UE-2 in step 514, which means taking it as time length for transmitting the update agreement message to the UE-2; on the other hand, the time period for transmitting the handover notification message to the UE-1 can be pre-configured; since the message travelling time lengths between the UE-1 and its home network are estimable, the waiting period of time can be determined according to the time length for transmitting the update agreement message to the UE-2 and the time period for transmitting the handover notification message to the UE-1.

Steps 516-517: the same as steps 413-414 in FIG. 4.

As mentioned, the CS media connection path between the UE-1 and the eMSC is established, which is composed of the CS media connection between the UE-1 and the CS network and the CS media connection between the CS network and the eMSC; a new media path between the eMSC and the UE-2 is established at the same time; the eMSC connects the newly established media path and the CS media path, so as to enable the UE-1 to continue communicating with the UE-2.

The disclosure further discloses a system for realizing single radio voice call continuity, and the system includes a user terminal, a remote leg of the user terminal, and an SC AS, wherein the user terminal is configured to receive a handover command in a PS domain, and configured to adjust an access mode to be accessing a CS domain after receiving a handover notification message transmitted from the SC AS;

the SC AS is configured to receive a handover request, and then update the remote leg and transmit the handover notification message to the user terminal.

Specifically, the user terminal may be further configured to, after receiving the handover command in the PS domain, adjust the access mode to be accessing the CS domain if the signal intensity of the PS domain is lower than a given threshold, even though the user terminal does not receive the handover notification message.

Specifically, in the system, the SC AS may be configured to receive an update agreement message fed back by the remote leg and then transmit the handover notification message to the user terminal.

Specifically, the SC AS may be configured to transmit a message requesting for initiating update to the remote leg after receiving the handover request; the SC AS may be further configured to receive an update request message transmitted from the remote leg, then transmit an update agreement message to the remote leg, and transmit the handover notification message to the user terminal after waiting for a period of time; wherein the waiting period of time does not exceed a difference between a time period for transmitting the update agreement message to the remote leg and a time period for transmitting the handover notification message to the user terminal.

Specifically, the SC AS may be further configured to measure a time length between a time of transmitting the message requesting for initiating update and a time of receiving the update request message, and determine the waiting period of time according to the time length.

Specifically, the handover notification message transmitted by the SC AS may be an IMS signaling message.

Of course, the disclosure may also have many other embodiments; the person skilled in the art can make various kinds of relevant modifications and variations based on the disclosure without departing from the spirit and nature of the disclosure, but these relevant modifications and variations shall all fall within the scope of protection of the claims attached with the disclosure.

The invention claimed is:

1. A method for realizing single radio voice call continuity which is applied in IP Multimedia Core Network Subsystem (IMS) network, the method comprising:
   receiving, by a Service Continuity Application Server (SC AS), a handover request, and then updating, by the SC AS, a remote leg, and transmitting, by the SC AS, a handover notification message to a user terminal;
   receiving, by the user terminal, a handover command in a Packet Switch (PS) domain and the handover notification message, then adjusting, by the user terminal, an access mode to be accessing a Circuit Switch (CS) domain,
   wherein the SC AS receiving the handover request and then updating the remote leg and transmitting the handover notification message to the user terminal comprises:
   transmitting, by the SC AS, a message requesting for initiating update to the remote leg after the SC AS receives the handover request;
   receiving, by the SC AS, an update request message transmitted from the remote leg, then transmitting, by the SC AS, an update agreement message to the remote leg, and transmitting, by the SC AS, the handover notification message to the user terminal after waiting for a period of time; wherein the waiting period of time does not exceed a difference between a time period for transmitting the update agreement message to the remote leg and a time period for transmitting the handover notification message to the user terminal.

2. The method according to claim 1, wherein the method further comprises: detecting, by the user terminal, a signal intensity of the PS domain after the user terminal receives the handover command in the PS domain; and adjusting, by the user terminal, the access mode to be accessing the CS domain if the signal intensity of the PS domain is lower than a given threshold, even though the user terminal does not receive the handover notification message.

3. The method according to claim 2, wherein the method further comprises:
   receiving, by the SC AS, an update agreement message fed back by the remote leg, and then transmitting, by the SC AS, the handover notification message to the user terminal.

4. The method according to claim 2, wherein the handover notification message is an IMS signaling message.

5. The method according to claim 1, wherein the method further comprises:
   receiving, by the SC AS, an update agreement message fed back by the remote leg, and then transmitting, by the SC AS, the handover notification message to the user terminal.

6. The method according to claim 1, wherein the method further comprises: measuring, by the SC AS, a time length between a time of transmitting the message requesting for initiating update and a time of receiving the update request message, and determining, by the SC AS, the waiting period of time according to the measured time length.

7. The method according to claim 1, wherein the handover notification message is an IMS signaling message.

8. A system for realizing single radio voice call continuity which is applied in IP Multimedia Core Network Subsystem (IMS) network, the system comprising: a user terminal, a remote leg of the user terminal, and a Service Continuity Application Server (SC AS), wherein
   the user terminal is configured to receive a handover command in a Packet Switch (PS) domain, and configured to adjust an access mode to be accessing a Circuit Switch (CS) domain after receiving a handover notification message transmitted from the SC AS;
   the SC AS is configured to receive a handover request, and then update the remote leg and transmit the handover notification message to the user terminal,
   wherein the SC AS is configured to transmit a message requesting for initiating update to the remote leg after receiving the handover request; the SC AS is further configured to receive an update request message transmitted from the remote leg, then transmit an update agreement message to the remote leg, and transmit the handover notification message to the user terminal after waiting for a period of time; wherein the waiting period of time does not exceed a difference between a time period for transmitting the update agreement message to the remote leg and a time period for transmitting the handover notification message to the user terminal.

9. The system according to claim 8, wherein the user terminal is further configured to detect a signal intensity of the PS domain after receiving the handover command in the PS domain, and adjust the access mode to be accessing the CS domain if the signal intensity of the PS domain is lower than a given threshold, even though the user terminal does not receive the handover notification message.

10. The system according to claim 9, wherein
the SC AS is configured to receive an update agreement message fed back by the remote leg and then transmit the handover notification message to the user terminal.

11. The system according to claim 9, wherein the handover notification message transmitted by the SC AS is an IP Multimedia Core Network Subsystem (IMS) signaling message.

12. The system according to claim 8, wherein
the SC AS is configured to receive an update agreement message fed back by the remote leg and then transmit the handover notification message to the user terminal.

13. The system according to claim 8, wherein the SC AS is further configured to measure a time length between a time of transmitting the message requesting for initiating update and a time of receiving the update request message, and determine the waiting period of time according to the measured time length.

14. The system according to claim 8, wherein the handover notification message transmitted by the SC AS is an IP Multimedia Core Network Subsystem (IMS) signaling message.

* * * * *